(12) United States Patent
Gross et al.

(10) Patent No.: US 9,397,974 B1
(45) Date of Patent: Jul. 19, 2016

(54) MICROBLOGGING SYSTEM AND METHOD FOR RESENDING POSTS

(71) Applicants: William Gross, Pasadena, CA (US); Girish Venkat, Pasadena, CA (US); Dong Chang, Sherman Oaks, CA (US); Jamie Belsky, San Francisco, CA (US)

(72) Inventors: William Gross, Pasadena, CA (US); Girish Venkat, Pasadena, CA (US); Dong Chang, Sherman Oaks, CA (US); Jamie Belsky, San Francisco, CA (US)

(73) Assignee: UBERMEDIA, INC., Pasadena, CA (US)

( * ) Notice: Subject to any disclaimer, the term of this patent is extended or adjusted under 35 U.S.C. 154(b) by 280 days.

(21) Appl. No.: 13/710,273

(22) Filed: Dec. 10, 2012

(51) Int. Cl.
*G06F 15/16* (2006.01)
*H04L 12/58* (2006.01)

(52) U.S. Cl.
CPC ...................................... *H04L 51/32* (2013.01)

(58) Field of Classification Search
CPC .......... H04L 51/04; H04L 51/32; H04L 51/34
See application file for complete search history.

(56) References Cited

U.S. PATENT DOCUMENTS

| 2011/0320423 | A1* | 12/2011 | Gemmell et al. | 707/706 |
| 2013/0031106 | A1* | 1/2013 | Schechter et al. | 707/749 |
| 2013/0298038 | A1* | 11/2013 | Spivack et al. | 715/753 |
| 2014/0040387 | A1* | 2/2014 | Spivack et al. | 709/206 |

OTHER PUBLICATIONS

Constine, Josh, "New 'Unread Messages' and 'Photo Memories' Features Suggest Facebook Activity to Users". May 12, 2010. pp. 1-3.*

* cited by examiner

*Primary Examiner* — Jonathan Bui
(74) *Attorney, Agent, or Firm* — Andrew S. Naglestad (57) ABSTRACT

A delivery assurance system for ensuring that people have an opportunity to view messages shared by authors to which they subscribe is disclosed. The delivery assurance system is configured to communicate with at least one author and a plurality of followers associated with the at least one author. The system in the preferred embodiment comprises a computer processor configured to receive a post from an author; transmit a first copy of the post to a plurality of users; determine if any of the plurality of users did not see the post; automatically transmit a second copy of the post to each of the plurality of users that did not see the first copy of the post; and remove the first copy of the post from a timeline of each user to which a second copy of the post was transmitted. Transmission of multiple copies of the messages, therefore, enables users to see a message regardless of when the author initially transmitted it.

10 Claims, 5 Drawing Sheets

MICROBLOGGING SYSTEM AND METHOD FOR RESENDING POSTS

CROSS-REFERENCE TO RELATED APPLICATION(S)

This application claims the benefit of U.S. Provisional Patent Application Ser. No. 61/568,514 filed Dec. 8, 2011, U.S. Provisional Patent Application Ser. No. 61/568,943 filed Dec. 9, 2011, and U.S. Provisional Patent Application Ser. No. 61/569,082 filed Dec. 9, 2011, which are hereby incorporated by reference herein for all purposes.

TECHNICAL FIELD

The invention relates to a technique for technique to that ensure users of social networking site see messages of interest. In particular, the invention relates to a system and method for repeatedly sending a copy of a message to a user until it is determined that the user has read the message.

BACKGROUND

Social network has revolutionized the way people communicate. It has never been easier to converse and share images with the friends, family, colleagues, as well as complete strangers across the globe. Despite the tremendous advantages in connectivity and convenience offered by social networking, people may still have difficulty communicating when, for example, incoming messages are lost in the timeline of the intended recipients. If a social networking user has friended or followed many others, the user's timeline may fill up so quickly that even new messages can soon be buried in the timeline by more recent posts. As such, users may miss out on important messages unless they take the time to consistently review all the unseen messages in their timeline. There is therefore a need for a solution that enables important messages to persist at or near the top of the timeline until the user has seen those messages.

SUMMARY

The invention features a delivery assurance system is a message sharing system for ensuring that people have an opportunity to view messages shared by authors to which they subscribe. The delivery assurance system is in communication with at least one author and a plurality of followers associated with the at least one author. The system in the preferred embodiment comprises a computer processor configured to: receive a post from an author; transmit a first copy of the post to a plurality of users; determine if any of the plurality of users did not see the post within a determined period of time; automatically transmit a second copy of the post to each of the plurality of users that did not see the first copy of the post; and remove the first copy of the post from a timeline of each user to which a second copy of the post was transmitted. The additional copies of the post are, therefore, sent to users that did not see a prior post, and may be sent at a predetermined frequency (e.g., every 8 to 24 hours) after the initial post or at certain times of day based on a predetermined schedule. A user is determined to have seen a post if, for example, the post was displayed to the user for a predetermined length of time, the post was clicked on by the user, the post was reposted by the user, the post was "liked" or "disliked" by the user, the post was saved or bookmarked by the user, or similar measure of user engagement.

In another embodiment, the delivery assurance system comprises a computer processor configured to: receive a post from an author; determine whether the post has been transmitted to a plurality of users before; if the post has been transmitted to the plurality of users before, then determine which users have seen the post; if at least one of the plurality of users has not seen the post, then automatically transmit a copy of the post to those users to which the post has been transmitted but that have not seen the post; and delete any earlier copies of the post from a timeline of each of those users to which a copy of the post was transmitted. In still another embodiment, the invention is implemented on a user device associated with a user, wherein the user device is in communication with a messaging system and at least one author to which the user subscribes. In this embodiment, the user device comprises a computer processor configured to: receive a post from an author; determine whether the post has been received at the user device before; if the post has been received at the user device before, determine whether the user saw the post; if the post has been received at the user device before and the user did not see the post: then automatically present the post to the user again; and delete any earlier copies of the post from a timeline of the user.

BRIEF DESCRIPTION OF THE DRAWINGS

The present invention is illustrated by way of example and not limitation in the figures of the accompanying drawings, and in which.

DETAILED DESCRIPTION OF THE PREFERRED EMBODIMENT

Although certain embodiments of the disclosed systems and methods are described below with reference to a microblogging service, such embodiments are intended to be illustrative and are not intended to limit the scope of the disclosure. For example, in other embodiments, the systems and methods may be used with other types of networked message platforms, social networking services, or with other types of content service providers.

Figure 1:
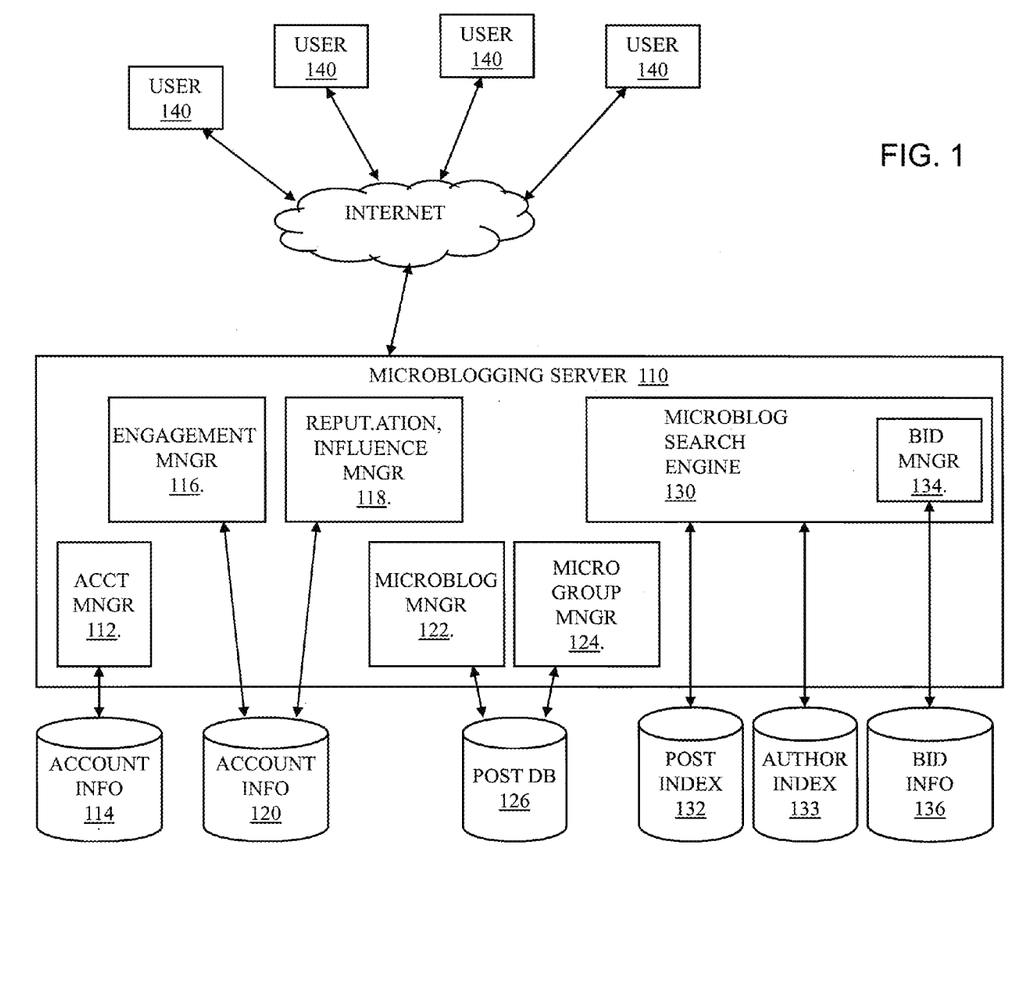
FIG. 1 is a network diagram including a microblogging server, in accordance with the preferred embodiment.

Examples of Systems and Methods for Compensation-Based Ranking of Posts or Authors Referring to FIG. 1, the microblogging server 110 hosts a microblogging website that provides an interface through which social networking users 140 can exchange and search microblog posts, post authors, or other content made available by the microblogging server 110. The users 140 can access the microblogging server 110 via the Internet or other network. A user 140 can be an author when generating posts and can be a follower when viewing the posts of other authors. An author can generate posts from a mobile device (e.g., a cellular telephone, laptop or tablet computer, personal digital assistant, etc.) or through a webpage hosted by the microblogging website. For example, an author can generate and upload posts via an "app" (application) hosted on a platform (e.g., a cellular telephone, desktop, laptop or tablet computer, personal digital assistant, interactive television, etc.). Followers can also view the posts via mobile devices (e.g., via a web page using a browser or via an app) and their personal account at the website. The microblogging server 110 includes an account manager 112 and account database 114 or other data store for maintaining user accounts including, e.g., user name, password, contact information, list of authors the user follows, list of the user's followers and their profile information, and bid information in some embodiments.

The microblogging server 110 also includes a microblog manager 122 for receiving incoming posts and storing those posts to a post database 126 or other data store where they are made available to users. In some embodiments, the microblog manager 122 is further configured to generate a continuous stream of posts in real-time which is made available to a microblog search engine 130 that enables user to search for and discover relevant content on topics of interest.

The microblogging server may further include an engagement manager 116, a reputation manager 118 and group manager 124, which are connected to one or more databases 120, 126 for storing and retrieving relevant metrics about users, authors, and followers. This information may, in turn, be used as a basis to recommend authors to follow and content of interest to users.

The engagement manager 116 is configured to determine the degree to which users interact with post or linked content, for example. The more times a user spends with a post and associated content (e.g., webpages and view), the greater the level of engagement. User engagement with a post may be represented quantitatively in terms of:
 1) the amount of time the user spends viewing the post or content,
 2) whether the user reposts the message,
 3) whether the user indicates approval/disapproval called a "like"/"dislike",
 4) whether the user opts to follow the author of the post just read,
 5) whether the user opts to subscribe to posts about the same topic or category as the post just read,
 6) whether the user opts to subscribe to posts organized by topic or channel based on a category, hashtag, or keywords of the post just read
 7) review the profile of the author of the post,
 8) whether the user submits a reply or comments in response to a post,
 9) whether the user interacts with a post by clicking on a link, zooming on a picture, watching a video embedded in the post,
 10) whether the user responds to an embedded poll,
 11) whether the user bids on an auction embedded in the post,
 12) whether the user replies to the post,
 13) whether the user comments on a previous message,
 14) whether the user creates a conversation in response to the post;
 15) whether the user creates a group discussion around the post;

The reputation/influence (RI) manager 118 is configured to determine a reputation score for authors, the score indicating the degree to which an author is regarded by people within a particular community or with regard to a particular topic. The reputation score of an author in based, in part, on the number of followers, the level of engagement of those followers with the author's posts, the number of times the author's post were viewed, and the level of engagement of those viewers. A reader's level of engagement may be measured using the metrics or other factors described above. For example, an author's reputation score increases the more often his/her posts are reposted, liked, or the embedded content viewed.

The group manager 124 is configured to support conversations around a particular topic or post. That is, users can start and moderate online discussions amongst a group of people. In one example implementation, a user initiates a conversation by (a) identifying a topic, theme, or question and (b) identifying the individuals that can participate in that conversation.

In some embodiments, a search engine (SE) 130 is configured to parse and index incoming posts in order to make them search by users. In one embodiment, a post can be indexed using various attributes of the post, its author, or web pages linked in the post. The posts of the post index 132 may be indexed based on one or more of the following attributes:
 1) the content of the post,
 2) the textual content of the post including words,
 3) the topic of the post,
 4) uniform resource locators (URLs) in the post,
 5) how often the same URL is clicked on by other users,
 6) the content of the resources targeted by URLs in the post,
 7) the number of followers of the post's author,
 8) the profile/biographical information of the followers of the post's author (e.g., one degree of separation between follower and author in a social graph),
 9) the number of followers that follow each follower of the post's author (e.g., two degrees of separation between follower and author in a social graph),
 10) the number of prior posts written by the author,
 11) the location of the post's author,
 12) biographical information of the author from, e.g., the author's profile,
 13) the history of the post including the number of times the post has been reposted and by whom,
 14) whether the post includes is a reply (e.g., having @reply with hash tag) or a re-post,
 15) how long ago the post was submitted (e.g., the date of the post relative to the current date),
 16) the number of times user's hover their cursor over the author's biographical information,
 17) the number of users that opt to follow the author after viewing the author's post or profile,
 18) other inputs to determine where the post will reside in the stream,
 19) aggregate level of engagement with the post by the followers/viewers,
 20) the number of times the post is viewed,
 21) reputation/influence score of the author.

The post index 132 can be used by a relevance manager which employs a search algorithm to determine the relevance of the post to a search query from a user 140 as well as the ranking of the post among the search results. The search results may be presented to a user submitting the query in substantially real-time.

In some embodiments, historical data about the author or a post—e.g., the number of times it was reposted—is accumulated by the SE and dynamically updated based on inspection of the post stream from the microblogging server 110. The historical information may be used as a metric in the relevancy algorithm employed by the search engine 130.

In addition to the post index 132, the search engine 130 can also maintain an author index 133 for identifying authors that may be of interest or otherwise relevant to a user conducting a search at the search engine 130, for example. In an example embodiment, the authors are indexed based on the authors' biographical information and various attributes, which can be derived from the microblogging service 110, the 130, or third party website. The authors in the author index 133 can be indexed (and the authors subsequently ranked) based on one or more of the following attributes:

1) the relevancy of words in the biographical information to the user's query,
2) how recent the author's biographical information was generated or updated,
3) the number of users following an author,
4) how often an author generates posts,
5) the words or content of some or all the author's prior posts,
6) the words or content of some or all of the posts written by people that the author follows or is a friend to,
7) the number of people that choose to follow an author based on results from the SE 130,
8) the length of time the author is registered with a microblogging service,
9) the geographic proximity of the author to the user submitting the query,
10) the length and completeness of an author's biographical information,
11) whether the author's biographical information includes an icon, an address, or an URL,
12) the expertise of an author on a topic as determined from the uniqueness, sophistication, or grade level of terminology describing the author's expertise and background,
13) whether an author has authored books, articles, or papers, or web pages on a particular topic,
14) the academic or professional credentials of an author,
15) an online retail webpage describing a book written by the post's author (e.g., a product display page on Amazon.com),
16) the popularity of the author based on search engine hits for the author's name,
17) whether the identify of the author is verified,
18) the number of fans or friends of the author on a social networking website (e.g., Facebook),
19) comments about the author on the social networking site,
20) the identity of the author's fans or friends on the social networking site,
21) the author's social graph and its attributes,
22) the profile/biographical information of the followers of a post's author (e.g., one degree of separation between follower and author in a social graph),
23) the number of followers that follow each follower of a post's author (e.g., two degrees of separation between follower and author in a social graph),
24) the author's reputation/influence score,
25) the reputation/influence score of the author by category or topic.

The author index 133 can be used by the relevance manager which employs a search algorithm to determine the relevance of the author to a search query as well as the ranking of the author among the search results. The search results may be presented to a user submitting the query in substantially real-time. Whether or not the user has initiated a keyword search, posts and/or author profile information may be served from the microblogging service 110 or search engine 130 and presented to users while interacting with webpages (e.g. content on computers, mobile devices, or televisions), initiating an application, or invoking a feature function, for example.

The search engine 130 can further include a bid manager 134 with a user interface through which an author can input bid information 136 to influence the ranking of the author's posts (where a user's post position may be enhanced compared to where the post position would be without payment for the post position enhancement). The bid information 136 can include a bid amount. The bid information 136 can also include one or more bid criteria specifying whom the author would like to target and for how long. A bid can represent the amount an author is to pay when the prescribed action is taken with respect to the post. In some embodiments, the bid amount may represent one or more of the following: (1) Cost per Impression (CPM), (2) Cost per Click (CPC) on the post or a link within the post, and (3) Cost per Time (CPT) the post is viewed. The bid criteria, in turn, may specify keywords of user queries for which the author's post may be returned as a search result. In one embodiment, the bid amount of each post is used together with the social networking attributes described above to filter search results as well as to determine the relevance of the post to a query at the microblog search engine 130. In some implementations, a post having a bid generally ranks higher in the search results than a post without a bid, all else being equal; and a post having a higher bid will generally rank higher than a post with a lower bid, all else being equal. The search results with posts or summaries of posts can then be returned to the user by the microblogging service 110 or directly by the search engine 130.

In some additional embodiments, the bid manager 134 can enable an author (sometimes referred to herein as a secondary author) to bid for the opportunity to target the followers of another author (sometimes referred to herein as a primary author). If interested, the targeted followers can sign up to follow the secondary author in addition to the primary author. In an example embodiment, a secondary author identifies the name or handle (e.g., a nickname rather than a legal name) of the primary author along with a bid amount. For a primary author, the secondary author submitting the highest bid may be selected for a campaign to attract new followers. The bid amount may correspond to a Cost per Action (CPA) such as, e.g., the amount to be paid by the secondary author for the following example actions: (i) each time a follower of the primary author signs on as a follower of the secondary author (sometimes referred to herein as a cost per follower (CPF) or pay per follower (PPF)) or (ii) each time the name or post of the secondary author is presented to a follower of the primary author. In some user interface implementations, the secondary author's post may be presented to the follower in a frame separate from the followed posts (or otherwise visually separated from the followed posts) or interleaved with the followed posts.

A secondary author can use the search engine 130 to target users who have desired characteristics (e.g., demographic, psychographic, behavioral, geographical, temporal, etc.), who have interests or categories of subject matter relevant to the posts of the primary or secondary authors, who may be followers of the primary author, or combinations of the foregoing. By appropriately targeting such users, the secondary author may be more likely to build a group of users who follow the secondary author.

Example Implementation of a Search Engine

Figure 2:
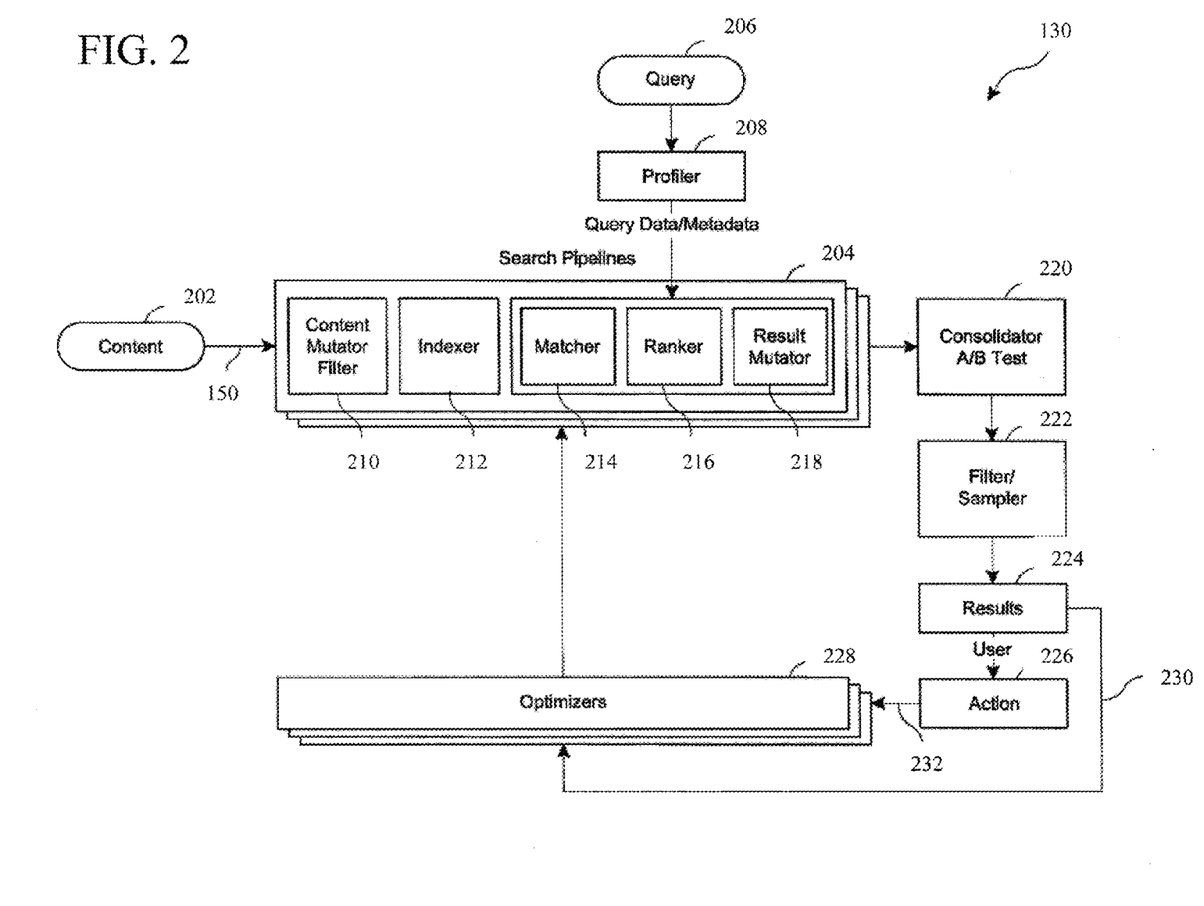
FIG. 2 is a functional block diagram of a search engine, in accordance with the preferred embodiment.

FIG. 2 is a functional block diagram of an example implementation of the search engine (SE) 130. The search engine 130 can receive content 202 from the stream 150 from the microblogging service 110. The content 202 can include posts from the post database 118, biographical information about the authors of posts, information from webpages linked to in posts, or any other type of information that may be relevant to users of the SE 130. The content 202 can also be received from other messaging services, social networking services, etc.

The content 202 can be indexed and ranked by the SE 130 so as to reply to queries from users. The SE 130 may store indexed post information in the post index 132 and indexed author information in the author index 154. A query 206 can include information such as, e.g., the search text submitted by a user, the web page the user is visiting to perform the search, user identification cookies, internet protocol (IP) addresses, geolocation information about the user, supported languages, user account information, web browser information, carrier network code, and so forth.

A profiler 208 may be used to annotate the query 206 with additional information or metadata that has been or can be gathered about the user (e.g., user characteristics), the user's social graph, the environment the query 206 is received from or being displayed in, demographic data, psychographic data, and behavioral data regarding the user, etc. The information from the query 206 and the profiler 208 may be referred to as query data and may be used by the SE 130 to perform the search.

The SE 130 can include one or more search pipelines 204 to perform the search. In some implementations, it may be advantageous to use multiple search pipelines 204 to efficiently process the content 202 and the query data and to provide sufficient flexibility and modularity of the SE 130. The number of search pipelines 204 can be increased as load increases so that the SE 130 is scalable. The search pipelines 204 may include a number of components (discussed below), which in some cases may be shared among the pipelines. Caches can be used at the end of the search pipelines or at any stage within the search pipelines depending on performance needs.

In some implementations, some or all of the search pipelines 204 can be relatively specialized pipelines configured for specialized functionality. The specialized pipelines may include one or more of: (i) a delayed search pipeline optimized to respond to mature content after indexing and optimization, (ii) a fast search pipeline to allow more real time data to be displayed in the search results, (iii) experimental search pipelines to use as candidates to replace or supplement existing search pipelines, (iv) diagnostic search pipelines configured to sample various qualitative or quantitative performance metrics in the SE, and (v) an editorial-content only search pipeline.

In the embodiment shown in FIG. 2, one or more of the search pipelines 204 can include a content mutator filter 210, an indexer 212, a matcher 214, a ranker 216, and a result mutator 218. The content mutator filter 210 may be used to explode data to match multiple terms in an index or to normalize the data to allow for more queries to match fewer documents based on an inventory of the documents that are indexed. The content mutator filter 210 may also be used to reject content that is expected to be of less relevance to users of the SE 130. In some embodiments, some or all of the functions performed by the content mutator filter 210 can be performed by the indexer 212. Possible or optional advantages of using the content mutator filter 210 can include improving the modularity in creating search pipelines and providing a better performance scrubbing step prior to communicating content to the indexer 212.

Some or all of the decisions on how to index the content 202 are performed by the indexer 212. The indexer 212 may parse and store indexes based on the content 202 (as filtered by the content mutator filter 210, if used). Various embodiments of the indexer 212 may use various methods for index storage. For example, in some embodiments, the indexer 212 may generate an inverted index to enable fast full text searches of the content 202. The indexer may index posts or authors according to one or more of the factors discussed above with reference to FIG. 1. The indexed information on posts can be stored in the post index 132 and indexed information on authors can be stored in the author index 154. In some implementations, multiple post indices or author indices are used. In other embodiments, posts and authors are indexed together.

The matcher 214 can identify content in the indices generated by the indexer 212 that are to be candidates for the query data. In some embodiments, the matcher 214 may annotate results with metadata that allows subsequent actions in the search pipeline 204 to be based on this metadata. The metadata may include, for example, cache longevity, relevance scores, source data that was used to generate a specific match, debugging data, or performance data.

The ranker 216 can be used to put the search results in a preferred order or ranking based on one or more relevancy criteria. The result mutator 218 can use the query data to perform additional filtering or manipulation of the search results, if desired. For example, the ranker 216 can use one or more of the following in determining a preferred ranking of the search results: (1) targeting criteria (e.g., contextual information, geographical or temporal information, demographic, psychographic, or behavioral data), (2) targeting by categories and interests, (3) targeting by social graph (e.g., boost relevancy for followers of a selected author), (4) other boost options (e.g., boost relevancy of posts with links), (5) historical data about the author or a post, e.g., the number of times a post has been reposted, (sometimes referred to herein as a reputation score), and (6) the bid information 136 (e.g., bid amount). By using some or all of the foregoing relevancy criteria, the ranker 216 advantageously may rank the search results (e.g., posts or authors) so that more relevant results will be returned to users submitting queries 206 to the SE 130. For example, the posts or authors ranked as most relevant will be displayed near the top of the search results displayed in a user interface. Also, by using some or all of these relevancy criteria, relevant posts or authors will tend to persist for longer periods of time than afforded by pure chronological (or reverse chronological) presentation, thereby enabling relevant posts and authors to be visible to a larger audience of users performing searches with the SE 130.

In some implementations, the ranker 216 can determine a relevancy score for an item (e.g., an author, author profile, or a post) that indicates how likely the user is to find the item to be interesting or relevant to the query 206 (e.g., a higher relevancy score may indicate a greater likelihood the user will find the author or post to be relevant). The ranker 216 can order the results from the indexer 212 or matcher 214 based at least in part on the relevancy score.

Information determined from the factors (1)-(6) described above may be weighted when determining the relevancy score for an item (e.g., an author or post). For example, in some implementations the relevancy score is weighted (from highest to lowest) based on matches to author biographical information, matches to keywords, matches to an author's real name, matches to an author's screen name or handle, information in the post.

In some implementations, for each item (e.g., author or post) in the search results, the ranker 216 determines a first relevancy score that does not include the bid information 136 (e.g., whether a bid has been made on a keywords or authors appearing in the search results). The ranker 216 then generates a second relevancy score for the item based on the first relevancy score and the bid information 136. Thus, the bid information 136 may be used to alter the relevancy (and therefore the ranking) of the items found in the search. In some such implementations, an item having a bid generally has a higher second relevancy score than an item without a bid, all else being equal; and an item having a higher bid will generally have a higher second relevancy score than an item with a lower bid, all else being equal.

A consolidator 220 receives the results from the search pipelines 204 and determines which pipelines will contribute to the search results that are communicated to the user. For example, in some implementations, the consolidator 220 may use an A/B test or a statistical test to determine which results to display to the user. A filter/sampler 222 can be used for filtering functions such as determining the maximum number of results to present to the user, determining legal or ethical compliance, determining account standings, etc. The filter/sampler 222 may also sample search results to determine that the SE 130 is performing as expected. The search results 224 can be communicated to the user (e.g., via a network such as the Internet, via a communications carrier to the user's mobile device, etc.).

In some embodiments, the search results may be categorized in one or more tiers. For example, the SE 130 or the microblogging service 110 may choose to determine one or more featured or sponsored authors. An editorial team may manually and/or via automated tools identify a group of authors who write high quality posts or authors who write posts that are highly relevant to a particular category or interest, and such featured or sponsored authors may be placed in a first tier that appears at the top of the rankings displayed in the user interface. The user interface may include a label or indicia (e.g., "Featured" or "Sponsored") near the display of author information to inform the user that the author is being featured or sponsored by the SE 130 or the microblogging service 110 and/or that the author is of high quality (e.g., reliable, interesting, and/or informative). Following the first tier of featured or sponsored authors, a second tier of authors can be presented to the user. The second tier of authors may be selected from authors who have bid on keywords, categories and interests, or primary authors. The ranking of the authors in the second tier may be based on a relevancy score that includes the bid information 136 (e.g., the second relevancy score described above). In some implementations, a third tier of authors may be presented to the user. These authors can include authors who have not submitted any bids or authors who have submitted bids but on topics that are not relevant to the search query 208. Authors in the third tier can be ranked based on relevancy scores that do not include the bid information 136.

The SE 130 may use one or more optimizers 228 to improve the performance of the SE. One or more optimizers 228 may be separate from the search pipelines 204 or may be configured to be specific to a particular search pipeline or to a particular component of functionality within the search pipeline. The optimizers 228 can receive (a) the search results 224 via a feedback loop 230 as well as (b) information on actions 226 performed by users viewing the search results via a feedback loop 232. The search results 224 may include information about the query 206, the search pipelines 204, and the set of posts and/or authors presented to the user. The user actions 226 may include user selection of posts, authors, or links included in a post or author profile (e.g., clicking a post or link to view it), user decisions to follow an author, interactions with posts or authors (e.g., clicks, hovers, non-clicks), etc. The optimizers 228 can use the information on the user actions 226, together with the search results 224, to determine which of the search results were of most relevance to the user and can use this relevance information to provide more useful search results in future searches for the present user and other users. For example, the optimizers 228 can be used to identify in the post index 132 or the author index 154 posts or authors that have low relevance (e.g., posts or authors that are rarely viewed or followed by users) so that future searches rank such posts or authors lower than other potentially more relevant posts or authors.

In various embodiments, the optimizers 228 can use various optimization techniques to improve the relevancy of the search results returned to users. For example, the optimizers 228 may use machine learning techniques to recognize patterns in the query data (e.g., from queries 206 and data from the profiler 208) to better determine the interests of a user (e.g., the posts or authors the user will find more interesting or relevant). In some implementations, the machine learning is trained on the query data and a statistical model is generated to develop classifiers for aspects of the users' interests. For example, machine learning can analyze terms or phrases in posts viewed by a user, the authors a user follows, and so forth to develop classifiers for user interests. In some implementations, a user profile is stored that includes such classifiers, which can be used during a search to identify and rank posts and authors that are more likely to be relevant to the user. In some embodiments, the training and classifying phases of the machine learning are not performed in real time but the classifiers developed by the machine learning can be used in real time to provide more relevant search results for a user.

Figure 3:
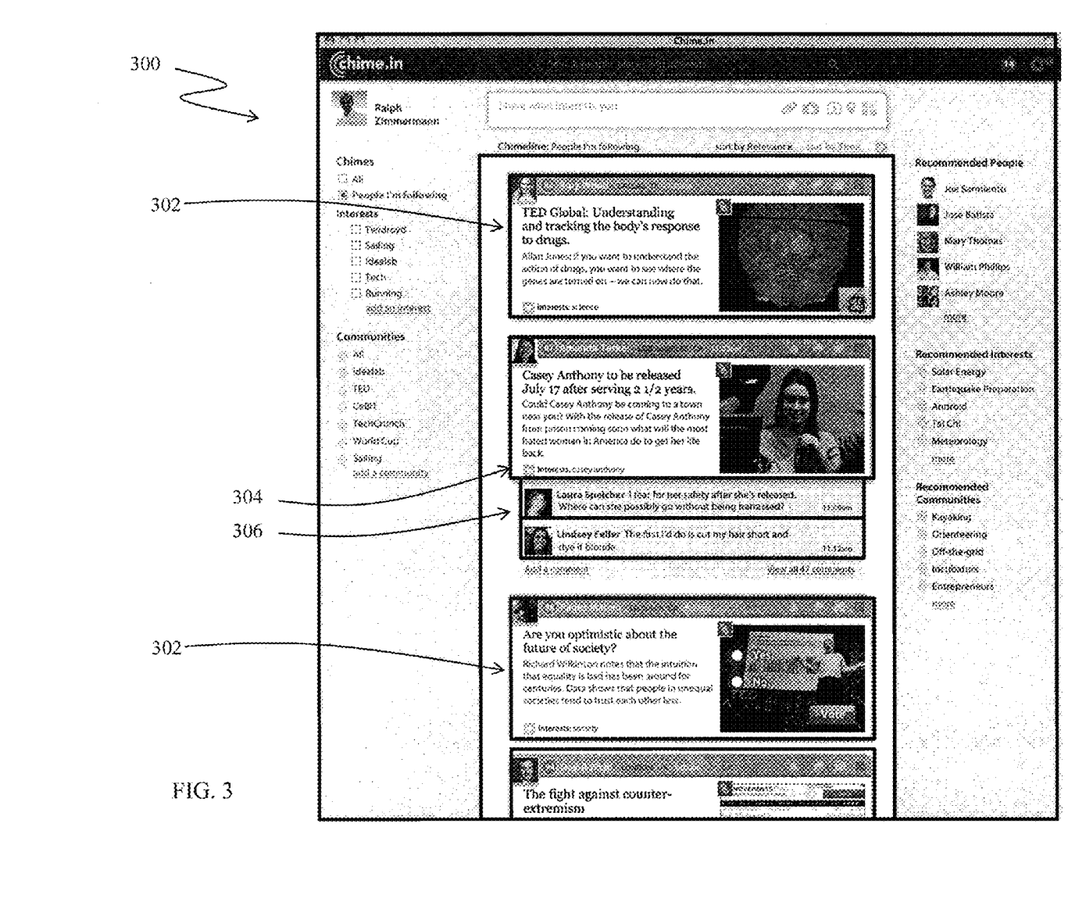
FIG. 3 is a screen shot of an exemplary user interface through which users view and interact with posts, in accordance with the preferred embodiment.

Illustrated in FIG. 3 is a screen shot of an exemplary user interface through which users view and interact with posts. The user interface 300 may be presented on a user computer or mobile communication device, for example. The list of posts 302 may include (a) posts and other content generated by people being followed by the user, sometimes referred to as a timeline, and/or (b) search results derived from a keyword search of posts and ranked by relevance. A timeline may be dynamically updated in substantially real time as the new author-generated content is pushed or otherwise transmitted to followers. The posts 302 of the timeline generally roll downward as new posts are added to the top of the list and the older posts roll off the bottom of the display. While a post is present on the user interface and visible to the user, the engagement manager may monitor how the user interacts with the posts to assess the user's level of interest in the subject matter of the post. Based on the level of engagement, the microblogging server may identify topics of interest to the user which may then be used to deliver relevant posts to the user, recommend additional authors to follow, and target advertising, for example.

In addition to recent posts 304, the timeline may further include peoples' comments 306 submitted in response to the posts. Like the posts, comments may include hyperlinks or graphics. In some embodiments, the comments presented in the timeline consist of all comments generated by the public in response to the particular post. In other embodiments, the comments presented in a user's timeline consist, i.e., are limited to, comments that are generated by authors to which the user subscribes. That is, the user is presented with only those comments generated by people that the user has opted to follow. In this manner, comments of people with no relation to the user are effectively filtered out of the user's timeline.

In some embodiments, the microblogging server 110 generates post rankings to enable users to identify highly relevant content and authors. Post rankings include popularity metrics normalized based on the most popular post of the author or community, for example. Popularity metrics may be generated based on "LIKES" and comments, as well as the number of times a post was shared, saved, clicked on, viewed, or voted on. To determine popularity of a particular post by an author, the microblogging server 110 compiles (1) a first metric equal to the percentage of readers of the post that "LIKED" the post and (2) a second metric equal to the percentage of readers that "LIKED" the most popular post by the author. The ratio of the first metric to the second indicates the relative popularity of the particular post, the ratio being greater than 0.50 for more popular posts and less than 0.5 for less popular posts. Similarly, the popularity metric may be used to measure popularity of a post across entire microblogging community. The ratio of a first metric to a third metric equal to the percentage of readers that "LIKED" the most popular post by any author in the community. Popular authors will tend to have ratios greater than 0.5 while less popular authors will tend to have ratios less than 0.5. In another embodiment, post rankings are based on "LIKES" and/or comments after being normalized with the number of followers, i.e., the number of "LIKES" or comments for a post divided by the number of people following the author of the post. Thus, a post "LIKED" by fewer people can rank higher than a post with more "LIKES" if the percentage of followers that "LIKED" the first post is greater than the second.

To determine the most popular content from an author, for example, the average number of "LIKES" is used to normalize the number of "LIKES" for an individual post, for example. When an author generates a post, for example, the system begins counting the number of "LIKES" for any given post and then normalizes that data using the average number of "LIKES" for all the author's posts. If the post is well liked by viewers relative to the author's other posts, the ratio will be relatively high. Normalization enables the most relevant and popular content of an author to be quickly identified. Similarly, the system may determine the average number of "LIKES" for all posts of a particular category, and that average used by the system to normalize posts in that the same category. In this manner, people can quickly discern which authors produce content that is the most relevant to that subject. As one skilled in the art will appreciate, a threshold or offset may be implemented so that normalization is only applied to posts that have exceeded a predetermined number of "LIKES," for example, so as to prevent authors with few followers from being over-represented in the popularity rankings.

Figure 4:
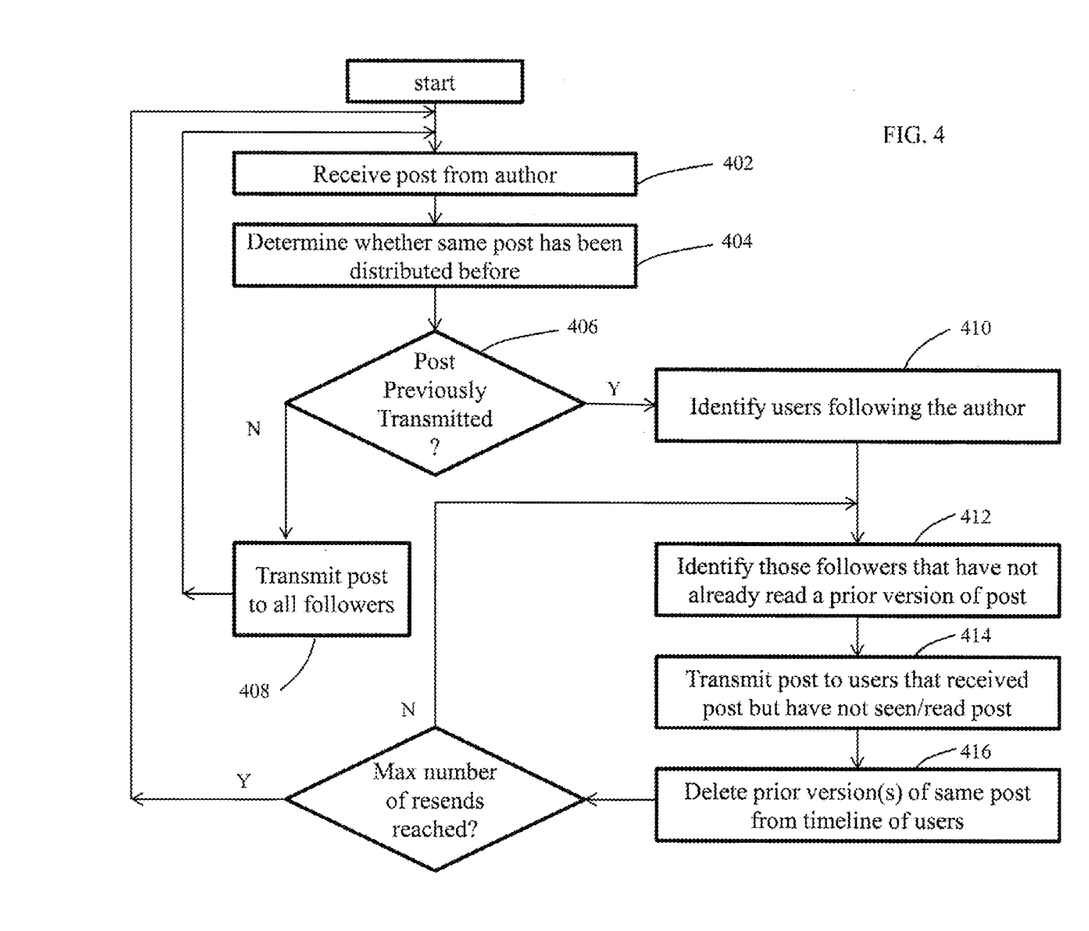
FIG. 4 is a method of repeatedly sending posts until read by the receipt, in accordance with the preferred embodiment.

Referring to FIG. 4, the microblogging server 110 in some embodiments includes a delivery-assurance (DA) system further configured to repeatedly send posts until read by the receipt and filter redundant posts as needed. Redundant posts are duplicate posts that are substantially identical except that they are sent at different days or times of day, and may appear at different times in a follower's timeline. In the preferred embodiment, the DA system is configured to automatically resend posts to followers until the post is seen by each follower. The posts may be resent at predetermined times of day or at a fixed frequency (e.g., every 8 to 24 hours). In some embodiments, the duplicate posts may be automatically resent to followers until the post becomes stale or other predetermined termination time reached.

The implementation in FIG. 4 includes server-side software including computer readable instructions that cause the microblogging server to process incoming posts from authors, resend posts to followers, and filter duplicate posts from a timeline as required. For example, when the server receives 402 a post submitted by an author, the server checks to see whether the same author has sent 404 an identical or a substantially identical post before. Two posts are identical if the body of the posts, including text and graphics, are identical, and differ only with respect to the time submitted to the server. If the new post is not the same as a prior post, decision block 406 is answered in the negative and the post distributed 408 or otherwise made available to the users that follow the author. If the new post is the same as a prior post, decision block 406 is answered in the affirmative and the server goes on to identify 410 the people following the author and identify 412 which, if any, followers have not yet read the earlier version of the post (need to track which users have read the post). Thereafter, the server transmits 414 the current version of the post to the users that did not read the earlier version of the post. To avoid duplication in the timelines, the server may also delete 416 the prior version of the duplicate post from the timeline of those users. In this manner, each user is only presented with one version of the duplicate post instead of each copy of the duplicate post.

Figure 5:
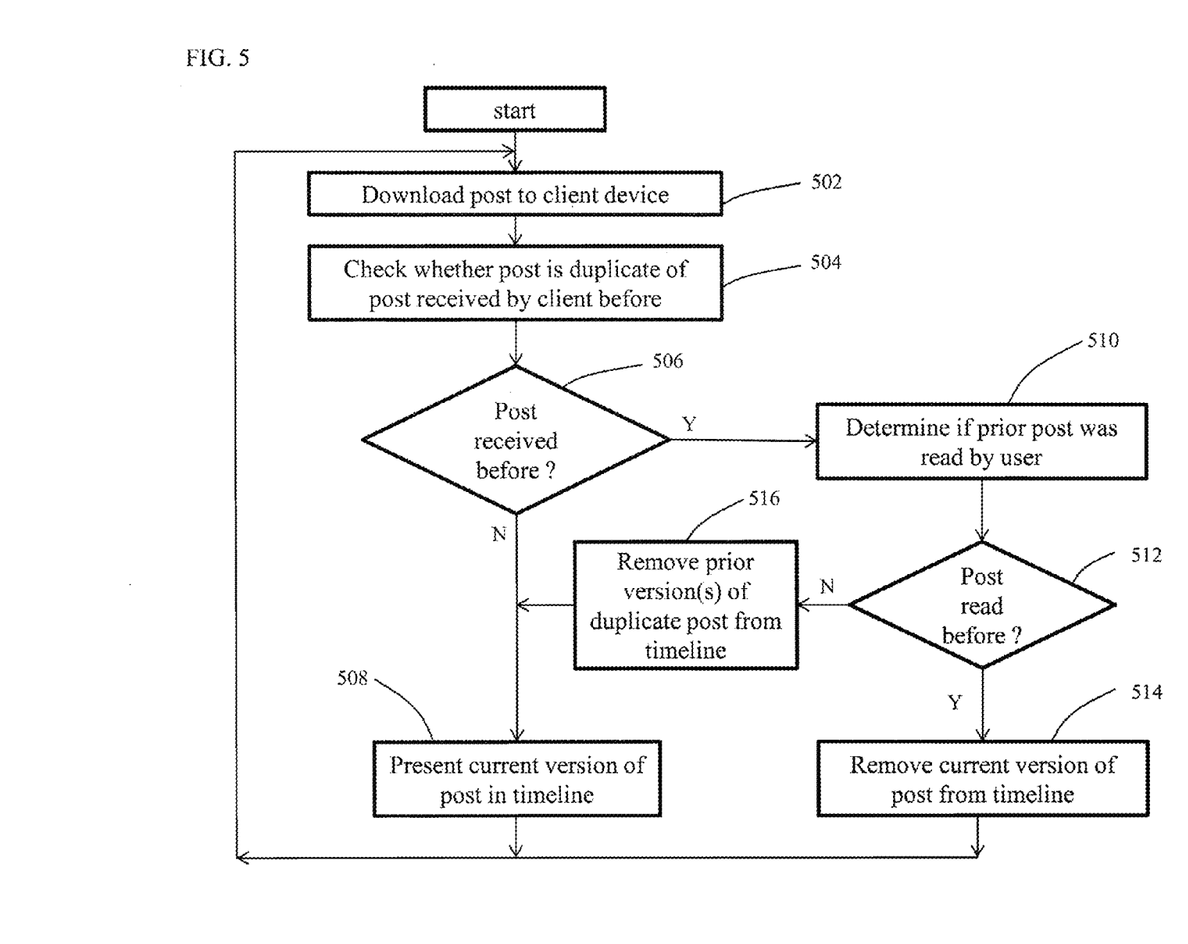
FIG. 5 is a client-side method of repeatedly sending posts until read by the receipt, in accordance with the preferred embodiment.

Illustrated in FIG. 5 is client side software configured to present resend a post until it is read by the recipient. In this embodiment, only one version of the duplicate posts to users through the client device. In this embodiment, the computer readable instructions cause the user's mobile device, for example, to download 502 posts from the microblogging server when the user logs on or refreshes his/her timeline. Each post is checked to determine if it is substantially identical to a prior post received within a predetermined period of time. To match posts, a hash sum may be generated from the content of the post and compared to the hash sum for other recent posts. If the hash sum of a post just downloaded is different from all the prior posts, the post just downloaded is determined to be new and the decision block 506 answered in the negative. In this case, the new post just downloaded is added 508 to the user timeline or otherwise queued up for inclusion in the timeline. If, however, the hash sum of a post just downloaded is the same as a prior post, the downloaded post is determined to be a duplicate and the decision block 506 answered in the affirmative.

When a duplicate post is detected, the client software checks 510 to see if the earlier version of the duplicate post was actually read by the user. A post is determined to have been read if (a) the post was presented to the user for more than a predetermined number of seconds, (b) the user clicked on the post, (c) the user LIKED the post, or (d) the user saved the post or bookmarked a link to the post, for example. If the earlier version of the post was not read, decision block 512 is answered in the negative, the earlier version of the duplicate post is removed 516 or otherwise omitted from the user's timeline, and the newer version of the duplicate post is added 508 to the user's timeline. If the earlier version of the post was read by the user, decision block 512 is answered in the affirmative and the most recent version of the post removed from the timeline or queue. As such, the timeline is effectively filtered so that the user sees one version of a duplicate post, rather than being subjected to multiple redundant posts.

In some embodiments, the microblogging server is configured to transmit a designated post to at least one user and periodically resend the post until the user has read the post. In this embodiment, a designated post is sent to the user and the user client attempts to determine whether the user has read the post based on his/her level of engagement. If the user clicks on the post, or LIKES the post, for example, the client device interprets this to mean that the post has been read and the micorblogging server stops transmitting copies of the post. If the user does not read the post, the microblogging server resends the post at a later time and the client again monitors to see whether the post is read. To avoid duplication, the microblogging server may optionally remove the prior post from the user's timeline if and when a new version of the post is added to the timeline. The process described above may be repeated for a predetermined period of time or until the client device determines that the user has read the post.

One or more embodiments of the present invention may be implemented with one or more computer readable media, wherein each medium may be configured to include thereon data or computer executable instructions for manipulating data. The computer executable instructions include data structures, objects, programs, routines, or other program modules that may be accessed by a processing system, such as one associated with a general-purpose computer or processor capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system. Examples of mass storage devices incorporating computer readable media include hard disk drives, magnetic disk drives, tape drives, optical disk drives, and solid state memory chips, for example. The term processor as used herein refers to a number of processing devices including personal computing devices, servers, general purpose computers, special purpose computers, application-specific integrated circuit (ASIC), and digital/analog circuits with discrete components, for example.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A delivery assurance system in communication with at least one author and a plurality of followers associated with the at least one author, the system comprising: a computer processor configured to:
   receive a post from an author;
   transmit a first copy of the post to a plurality of users;
   determine if any of the plurality of users did not see the first copy of the post within a determined period of time;
   automatically transmit a second copy of the post to each of the plurality of users that did not see the first copy of the post; and
   remove the first copy of the post from a timeline of each user to which a second copy of the post was transmitted.

2. The delivery assurance system of claim 1, wherein one or more additional copies of the post are sent to users that did not see a prior post.

3. The delivery assurance system of claim 2, wherein the one or more additional copies of the posts are sent one at a time with a predetermined frequency.

4. The delivery assurance system of claim 3, wherein the predetermined frequency is less than twenty-four hours.

5. The delivery assurance system of claim 3, wherein the predetermined frequency is substantially equal to eight hours.

6. The delivery assurance system of claim 2, wherein the one or more additional copies of the posts are sent at one or more predetermined times in a day in accordance with a schedule.

7. The delivery assurance system of claim 1, wherein a user is determined not to have seen the first copy of the post unless: the first copy of the post was displayed to the user for a predetermined length of time, the first copy of the post was clicked on by the user, the first copy of the post was reposted by the user, the first copy of the post was "liked" or "disliked" by the user, or the first copy of the post was saved or bookmarked by the user.

8. A delivery assurance system in communication with at least one author and a plurality of followers associated with the at least one author, the system comprising: a computer processor configured to:
   receive a post from an author;
   determine whether the post has been transmitted to a plurality of users before;
   when the post has been transmitted to the plurality of users before, determine which users have seen the post;
   when at least one of the plurality of users has received the transmitted post but has not seen the post, then
      a) automatically transmit a first copy of said post to those users that have received the transmitted post but have not seen the post; and
      b) delete any earlier instance of said post from a timeline of each of those users to which an instance of said post was transmitted.

9. A method implemented by a delivery assurance system in communication with at least one author and a plurality of followers associated with the at least one author, the method comprising:
   receiving a post from an author;
   transmitting a first copy of the post to a plurality of users;
   determining if any of the plurality of users did not see the first copy of the post;
   automatically transmitting at least a second copy of the post to each of the plurality of users that did not see the first copy of the post; and
   removing the first copy of the post from a timeline of each user to which the second copy of the post was transmitted;
   wherein the method is performed in its entirety by a computer system comprising computer hardware.

10. The method of claim 9, wherein determining if any of the plurality of users did not see the first copy of the post further comprises determining whether: the first copy of the post was displayed to the user for a predetermined length of time, the first copy of the post was clicked on by the user, the first copy of the post was reposted by the user, the first copy of the post was "liked" or "disliked" by the user, or the first copy of the post was saved or bookmarked by the user.

* * * * *